United States Patent [19]

Novak et al.

[11] Patent Number: 5,232,505
[45] Date of Patent: Aug. 3, 1993

[54] APPARATUS FOR THE AUTOMATIC CASTING, COATING, VARNISHING, TESTING AND SORTING OF WORKPIECES

[75] Inventors: Emmerich Novak, Obertshausen; Reiner Seiler, Hanau, both of Fed. Rep. of Germany

[73] Assignee: Leybold Aktiengesellschaft, Hanau, Fed. Rep. of Germany

[21] Appl. No.: 781,746

[22] Filed: Oct. 23, 1991

[30] Foreign Application Priority Data

Aug. 19, 1991 [DE] Fed. Rep. of Germany ....... 4127341

[51] Int. Cl.$^5$ ..................... B05C 11/00; C23C 14/00; B65H 1/00; B66C 23/00
[52] U.S. Cl. ..................... 118/712; 118/50; 118/719; 118/730; 118/500; 414/222; 414/744.2; 414/757
[58] Field of Search ............... 118/712, 730, 733, 719, 118/729, 500, 50; 198/394; 414/222, 225, 627, 744.2, 757, 331

[56] References Cited

U.S. PATENT DOCUMENTS

| | | | |
|---|---|---|---|
| 3,552,584 | 1/1971 | Heinrich | 214/8.5 |
| 4,629,053 | 12/1986 | Dailey | 198/346.1 |
| 4,759,681 | 7/1988 | Nogami | 414/417 |
| 4,938,654 | 7/1990 | Schram | 414/757 |
| 4,969,790 | 11/1990 | Petz et al. | 414/217 |

FOREIGN PATENT DOCUMENTS

| | | |
|---|---|---|
| 1237005 | 8/1963 | Fed. Rep. of Germany . |
| 1531862 | 5/1970 | Fed. Rep. of Germany . |
| 7836568 | 4/1979 | Fed. Rep. of Germany . |
| 3432700 | 3/1985 | Fed. Rep. of Germany . |
| 3628670 | 8/1987 | Fed. Rep. of Germany . |
| 3702775 | 8/1988 | Fed. Rep. of Germany . |
| 3909669 | 10/1989 | Fed. Rep. of Germany . |

OTHER PUBLICATIONS

DE-Z: Reger, H.: Bearbeitung und Montage von Kunststoffteilen mit automatischen, flexiblen Fertigungseinrichtungen. In: Kunststoffe 75, 1985, 10, S.728-734.
DE-Z: Ahrens, Harald: Herstellung einer LV-Bildplatte. In: Funkschau, 21, 1982, s. 65-68.
DE-Z: Rohs, H.-G.: Die Automatisierung des Werkstückwechsels. In: Industrie-Anzeiger, 1971, Nr. 7, S. 129-134.

*Primary Examiner*—William A. Powell
*Attorney, Agent, or Firm*—Felfe & Lynch

[57] ABSTRACT

In an apparatus for the automatic casting, coating, varnishing, inspecting and sorting of workpieces--especially of optical or magneto-optical data storages--with at least one transport apparatus advancing the substrates from a production station to the processing stations, and with a stacking station for the separate stacking of workpieces that are finished and have been found perfect and workpieces containing defects, a substrate transporting apparatus is provided which has a transport carriage (3) which can be moved back and forth along a straight line and has three transport arms (4,4',4";5,5',5") bearing substrate holders (6, 6',6";7,7',7") on each side of the carriage. Furthermore, on the one side of the transport carriage (3) there is provided a vacuum coating apparatus (8) and a stacking apparatus (10, 11) disposed on the other side of the transport carriage, and furthermore an apparatus for quality testing (9) and a carousel transport apparatus (13) disposed opposite the injection molding machine (12) in the direction of movement of the transport carriage and having various varnishing, drying, printing, print inspecting and substrate centering apparatus (14 to 19) disposed on its circumference.

9 Claims, 2 Drawing Sheets

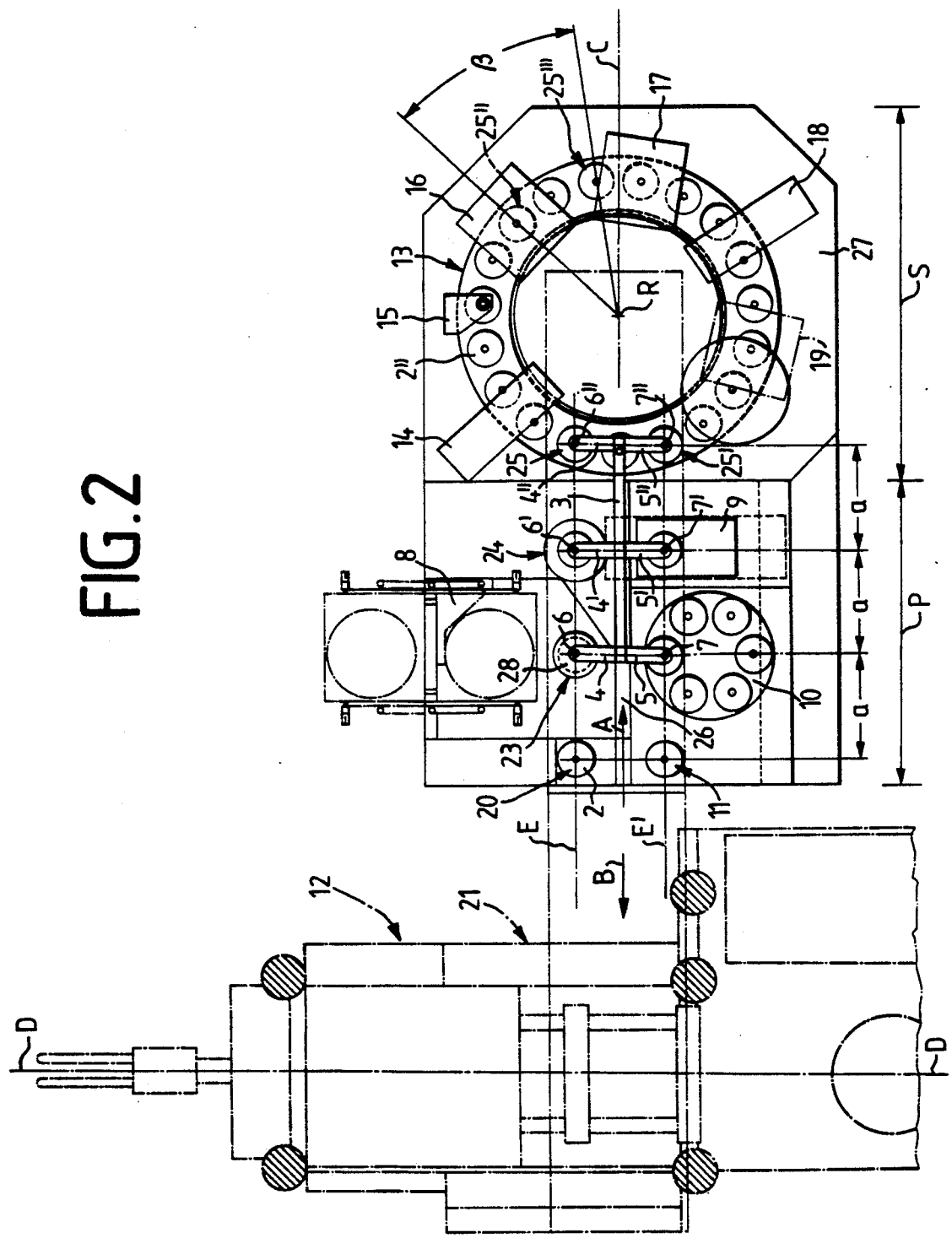

APPARATUS FOR THE AUTOMATIC CASTING, COATING, VARNISHING, TESTING AND SORTING OF WORKPIECES

The invention relates to an apparatus for the automatic casting, coating, varnishing, testing and sorting of workpieces—especially of circular disk-shaped, flat substrates of plates, such as optical or magneto-optical data storage devices, for example—with at least one transport apparatus advancing the substrates from a production station—an injection molding machine for example—to the processing stations, and with a stacking station for the separate stacking of processed workpieces which have been found perfect and workpieces containing defects.

Apparatus or plants of the kind in question are known, in which the individual processing stations are set upon the floor of the production facility in a line one behind the other, the workpieces being transported by a plurality of handling systems from the one production station to the next. A disadvantage of such a production line is that it requires a great amount of space and is expensive to purchase, especially since the handling systems have to be equipped at least to some extent with transport arms which have to move the workpieces in a first step transversely across the main transport line or line of flow of the workpieces, and then move them in other direction.

The present invention is therefore addressed to the problem of improving the production procedure, especially in the manufacture of CD's, and especially to lower the cost of the handling system. The apparatus is to work with a handling system of simple design and without a conveyor belt.

This problem is solved in accordance with the invention by a transport system with a carriage that can move back and forth in a straight line with three transport arms with substrate holders disposed on both sides of the carriage, with a vacuum coating apparatus provided on the one side of the transport carriage and a stacking apparatus disposed on the other side of the transport carriage and having at least one stack for substrates found good and one for rejected substrates, and an apparatus for quality testing and, disposed opposite the injection molding machine in the direction of movement of the transport carriage, a carousel transport device or a turntable with various varnishing, drying, imprinting, print inspection and substrate centering apparatus disposed on its circumference, the turntable moving the substrates, in a plurality of steps—preferably in nineteen steps—on a circular of a full 360 about the vertical axis of rotation of the turntable, and the transport carriage, in its movement in the one direction transporting a first substrate in a single step from the transfer station of the output station to the inlet and outlet lock station of the vacuum coating apparatus, and likewise with the transport arm moving a second substrate from the coating station to a varnishing station and likewise a third substrate from the varnishing station to the turntable which rotates stepwise and at the same rhythm, and the transport carriage, in its next movement in the opposite direction transports a finished workpiece to the test apparatus and a tested workpiece to the first stack or a workpiece form here to the second stack.

Preferably, the path of movement of the carriage equipped with six transport arms runs on the one hand at about right angles to the length of the injection molding machine and on the other hand about the axis of rotation of the turntable, the transfer station, the inlet and outlet lock station, the varnishing station and a substrate holder of the turntable being disposed on a straight line parallel to the path of movement.

Additional details and features are described and identified in the claims.

The invention admits of a great variety of embodiments; one of them is represented diagrammatically in the appended drawings, wherein:

FIG. 2 is a plan view of the apparatus according to FIG. 1.

Figure 1:
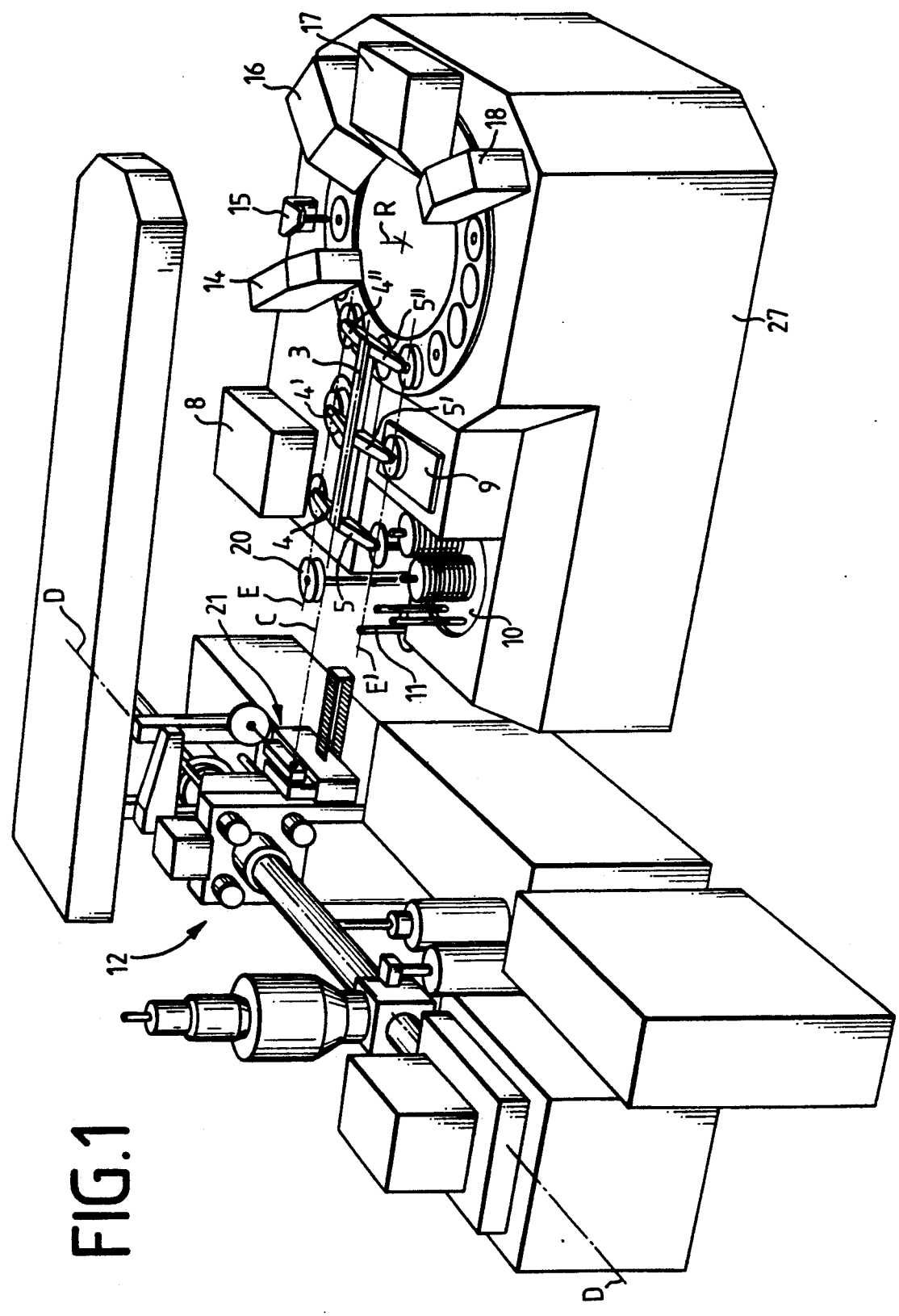
FIG. 1 is a perspective view of the apparatus according to the invention.

The apparatus represented serves for the fully automatic production of compact disks—so-called CD's.

The production of CD's takes place in individual processing units which are connected together by two handling systems.

The apparatus according to the invention consists substantially of two main parts P and S.

The first part P performs the following functions:

Picks up the substrate 2,2', . . . , which is set down by the injection molding machine 12 at a transfer point 20.

Transfers the substrates 2,2', . . . to a special vacuum coating apparatus 8.

Removes the metallized substrates at 23.

Transfers the substrates 2,2', . . to a varnishing station 24.

Removes the varnished substrates 2,2', . . .

Transfers it to the secondary part S of the apparatus.

Picks up the substrates 2, 2', . . . from the secondary part S.

Loads and unloads an inspection system 9.

Stacks the good substrates on the receiver 10.

Separately stacks the bad substrates on the receiver 11.

At the same time this part of the handling system is an appropriately constructed clean chamber of the smallest possible dimensions which is integrated in the machine.

The secondary part S of the apparatus P and S contains the following processing units:

Multifunctional ultraviolet curing system 14, 18,

Up to a maximum of three screen printing units 16, 17 and, if only two screen printing units 16, 17, are installed, A possible additional printing inspection unit 19.

The second part S consists of a rotatable substrate holder or turntable which has a certain number of substrate holders 25,25', . . . in an equidistant distribution and circular arrangement, in which the substrates 2,2', . . . are gripped by means of pneumatic devices.

In this second part S the substrates 2,2', . . . are transported step-wise on a circular course from a pick-up position 25 through a multifunctional ultraviolet curing unit 14 and an adjusting unit 15 into the first screen printing station 16.

Then follows the curing of the ultraviolet screen printing ink in an ultraviolet curing apparatus 18 that follows. To solve the problem of applying to the substrate a three-color screen-printed image while at the same time minimizing the number of ultraviolet curing apparatus, a special division of processing units and step length of the drive was established.

From this the possibility is obtained of fusing the first ultraviolet curing device in the process both for curing the ultraviolet-blocking varnish and for curing the ultraviolet screen printing ink after the second screen printing unit 17, in alternation.

After the application of the third screen print in the third screen printing unit the substrate is transported through the ultraviolet curing device, where the screen printing ink is cured and then the substrate is released from the substrate holder 25' in the transfer position.

In an embodiment with only two screen printing units 16, 17, there is also the possibility of installing a print inspection apparatus 19. The construction of the substrate holder also permits minimizing manipulation functions for feeding the substrates to the individual processing unit (ultraviolet curing system and screen printing units).

By this solution, the handling steps are drastically reduced and at the same time multiple use of processing units is made possible.

The handling system according to the invention makes possible an especially compact and low-cost configuration of all processing units, which permits a simple solution as regard control technology, while the production cycle of approximately 6 seconds excels known apparatus of this kind.

The substrate transport system, consisting of a transport carriage 3 moving back and forth along a straight line, with three transport arms 4, 4', 4'' and 5,5',5'' with substrate holders 6, 6', 6'' and 7,7',7'', respectively, on each side of the carriage 3, has a special influence on the fast operation of the apparatus according to the invention.

The transport carriage 3 is motor-driven along a distance a, the movement taking place along a line C running approximately at right angles to the length D of the injection molding machine 12.

The substrate holders 6, 6', 6'' provided on the transport arms 4,4',4'' are of circular disk shape and serve simultaneously as cover 28 for the inlet and outlet lock opening of the sputtering apparatus 8.

It is clear that at least the substrate holders or substrate grippers configured as the cover 28 must be able to be raised slightly vertically to enable them to be placed sealingly on the inlet and outlet lock opening 23 or to be removed therefrom.

The turntable 13 has a total of nineteen substrate holders and is rotated step-wise (in the rhythm of the back-and-forth movements of the transport carriage 3) by the amount of an angle $\beta$.

The processing stations and working apparatus 14 to 19 disposed around the turntable 13 are bolted to the machine frame 27 and can be replaced at any time.

We claim:

1. Apparatus for the automatic casting, coating, varnishing, testing and sorting of workpieces of circular disk-shaped, flat substrates of plastic for data storages comprising: a production station and working stations, at least one transport apparatus for advancing the substrates from the production station having a delivery station with a transfer station to the working stations, and at least one receiver each for the separate receiving of substrates that are finished and found perfect and substrates that are defective, a substrate transport apparatus having a transport carriage which is movable back and forth along a straight line and which has three transport arms on each side having substrate holders, a vacuum coating apparatus on one side of the transport carriage and having a lock station, and a stacking system disposed on another side of the transport carriage, and an apparatus for quality testing; and a rotatable transport system disposed opposite the production station in the direction of movement of the transport carriage with varnishing, drying, printing, print inspection apparatus disposed on its circumference, the rotatable transport system moving the substrates in a plurality of transport steps on a circular path of a full 360 degrees about a vertical axis of rotation of the rotatable transport system, and the transport carriage in its movement in one direction transporting with its first arm a first substrate in a single transport step from the transfer station of the delivery station to the lock station of the vacuum coating apparatus and, with another transport arm, also simultaneously moving a second substrate from the coating apparatus to varnishing apparatus and likewise moving a third substrate from the varnishing apparatus to the rotatable transport system which rotates stepwise and in the same rhythm, and the transport carriage in its next movement in an opposite direction (B) transports a finished substrate to the inspection apparatus and transports an already inspected substrate to the first receiver or a substrate to the second receiver.

2. Apparatus according to claim 1, in which the rotatable transport system has a substrate holder and in which the path of movement (C) of the transport carriage equipped with six transport arms runs approximately at right angles to a length (D) of the production station and approximately intersects the axis of rotation (R) of the rotatable transport system, while the transfer station, the lock station, the varnishing apparatus and the substrate holder of the rotatable transport system are disposed on a straight line (E) parallel to the path of movement (C).

3. Apparatus according to claim 2, in which the rotatable transport system has another substrate holder and in which distance (a) between the transfer and lock stations and the varnishing apparatus and one substrate holder and the distance (a) between the transfer and lock stations and the varnishing apparatus and the other substrate holder is equal in each case.

4. Apparatus according to claim 1 which includes centering apparatus and in which on the rotatable transport system a plurality of substrate holders are provided whose distances apart are equal in each case, the apparatus for the printing, drying, centering and inspection being disposed at about equal distances apart approximately uniformly on the circumference of the rotatable transport system, substantially above the substrates.

5. Apparatus according to claim 1 in which the transport carriage has a total of six transport arms, movable alternately by motor forward (in direction A) and back (in direction B) in the rhythm of the production station each time by a transport step (a), taking place synchronously with the step-wise advancement of the rotatable transport system by the angle ($\beta$) which is formed in each case between a first and a third adjoining substrate holder and the axis of rotation (R) of the rotatable transport system.

6. Apparatus according to claim 1, which includes a rail and in which the transport carriage is held and guided in the rail and is movable back and forth has on each side of its length three transport arms of equal length.

7. Apparatus according to claim 6 in which the substrate holders, the lock station, working areas of the varnishing apparatus, of the drying apparatus and of the centering apparatus and working areas of the printing apparatus and quality testing apparatus are all disposed on the same plane.

8. Apparatus according to claim 1 which includes a machine frame and in which the working stations associated with the rotatable transport system are held removably to the machine frame.

9. Apparatus according to claim 1 in which the transport carriage transports substrates simultaneously both in one and in an opposite direction (A - B), and at least one of the circular disk-shaped substrate holders on the transport arms acts simultaneously as a cover for the lock station of the vacuum coating chamber apparatus.

* * * * *